(12) United States Patent
Sun

(10) Patent No.: US 8,921,727 B2
(45) Date of Patent: Dec. 30, 2014

(54) DOUBLE-LAYER ELECTRODE DEVICE

(71) Applicant: HengHao Technology Co. Ltd, Taoyuan County (TW)

(72) Inventor: Hsun Ming Sun, Taichung (TW)

(73) Assignee: HengHao Technology Co. Ltd., Pingjhen (TW)

( * ) Notice: Subject to any disclaimer, the term of this patent is extended or adjusted under 35 U.S.C. 154(b) by 183 days.

(21) Appl. No.: 13/728,899

(22) Filed: Dec. 27, 2012

(65) Prior Publication Data

US 2014/0174896 A1 Jun. 26, 2014

(30) Foreign Application Priority Data

Dec. 20, 2012 (TW) .............................. 101148787 A

(51) Int. Cl.
*H03K 17/975* (2006.01)
*G06F 3/044* (2006.01)
*H01H 1/10* (2006.01)

(52) U.S. Cl.
CPC . *H01H 1/10* (2013.01); *G06F 3/044* (2013.01)
USPC ............................. 200/600; 345/173; 345/174

(58) Field of Classification Search
USPC ................................................. 200/278, 600
See application file for complete search history.

(56) References Cited

U.S. PATENT DOCUMENTS

| | | | | |
|---|---|---|---|---|
| 7,864,503 B2* | 1/2011 | Chang | ........................ | 361/288 |
| 8,493,337 B2* | 7/2013 | Liang et al. | ................... | 345/173 |
| 8,629,842 B2* | 1/2014 | Jang | ............................ | 345/173 |
| 8,717,333 B2* | 5/2014 | Ozeki et al. | .................... | 345/174 |
| 2008/0277259 A1* | 11/2008 | Chang | ........................ | 200/600 |
| 2009/0213090 A1* | 8/2009 | Mamba et al. | ................ | 345/174 |
| 2011/0057893 A1* | 3/2011 | Kim et al. | ..................... | 345/173 |
| 2012/0319990 A1* | 12/2012 | Chan et al. | .................... | 345/174 |
| 2013/0155011 A1* | 6/2013 | Kim et al. | ..................... | 345/174 |
| 2014/0027262 A1* | 1/2014 | Kim et al. | ..................... | 200/600 |

* cited by examiner

*Primary Examiner* — Kyung Lee
(74) *Attorney, Agent, or Firm* — Donald E. Stout; Stout, Uxa & Buyan, LLP

(57) ABSTRACT

A double-layer electrode device includes an electrode bottom layer formed on a transparent substrate, and an electrode top layer formed on the electrode bottom layer. First electrodes of the electrode bottom layer are separated from each other, and second electrodes of the electrode bottom layer are connected via second conductive connecting portions. An insulating block is formed on the second conductive connecting portion. Second electrodes of the electrode top layer are separated from each other, and first electrodes of the electrode top layer are connected via first conductive connecting portions, which are disposed cross the insulating blocks, respectively.

11 Claims, 2 Drawing Sheets

DOUBLE-LAYER ELECTRODE DEVICE

CROSS-REFERENCE TO RELATED APPLICATIONS

The entire contents of Taiwan Patent Application No. 101148787, filed on Dec. 20, 2012, from which this application claims priority, are incorporated herein by reference.

BACKGROUND OF THE INVENTION

1. Field of the Invention

The present invention generally relates to a touch panel, and more particularly to a double-layer electrode device.

2. Description of Related Art

A touch screen is an input/output device that adopts sensing technology and display technology, and has been widely employed in electronic devices such as portable or hand-held electronic devices.

A capacitor-based touch panel is a commonly used touch panel that utilizes capacitive coupling effect to detect touch position. Specifically, capacitance corresponding to the touch position changes and is thus detected, when a finger touches a surface of the touch panel.

FIG. 1A to FIG. 1C show a process of manufacturing a conventional electrode device 100. As shown in FIG. 1A, an indium tin oxide (ITO) layer is first formed on a glass substrate 10 and is then lithographically etched to form a conductive connecting portion 121. Subsequently, as shown in FIG. 1B, an insulating block 13 is formed on the conductive connecting portion 121. Finally, as shown in FIG. 1C, X electrode lines 11 and Y electrode lines 12 are formed. A conductive connecting portion 111 of the X electrode line 11 crosses the insulating block 13 to electrically connect the X electrode line 11. However, as the insulating block 13 has substantive thickness, the conductive connecting portion 111 at sidewall of the insulating block 13 possesses a large slope, which incurs a broken line and therefore lowers yield.

A need has thus arisen to propose a novel electrode device to overcome deficiencies of the conventional touch panels.

SUMMARY OF THE INVENTION

In view of the foregoing, it is an object of the embodiment of the present invention to provide a double-layer electrode device with an overall thicker electrode to prevent the conductive connecting portion crossing the insulating block from being broken, thereby increasing yield. Moreover, the embodiment may lower resistance of the electrode layer, facilitate the process of forming a thick electrode layer or conserve electrode material.

According to one embodiment, a double-layer electrode device includes a transparent substrate, an electrode bottom layer, a plurality of insulating blocks and an electrode top layer. The electrode bottom layer is formed on the transparent substrate, the electrode bottom layer including a plurality of first electrode lines and a plurality of second electrode lines, each said first electrode line including a plurality of first electrodes that are separated from each other, and each said second electrode line including a plurality of second electrodes that are connected via second conductive connecting portions. The insulating blocks are formed on the second conductive connecting portions respectively. The electrode top layer is formed on the electrode bottom layer, the electrode top layer including a plurality of first electrode lines and a plurality of second electrode lines, each said first electrode line including a plurality of first electrodes that are connected via first conductive connecting portions disposed cross the insulating blocks, and each said second electrode line including a plurality of second electrodes that are separated from each other.

DETAILED DESCRIPTION OF THE INVENTION

Figure 2A:
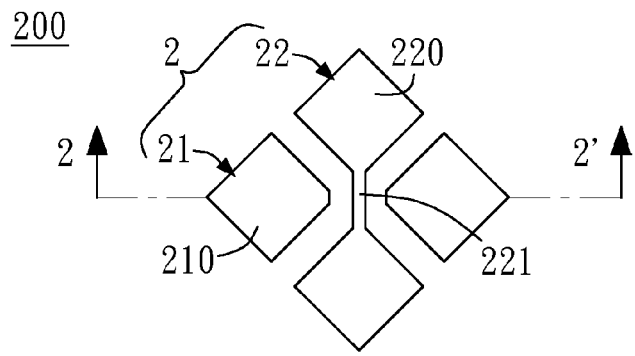
FIG. 2A to FIG. 2C show a process of manufacturing a double-layer electrode device according to one embodiment of the present invention.
Figure 2B:
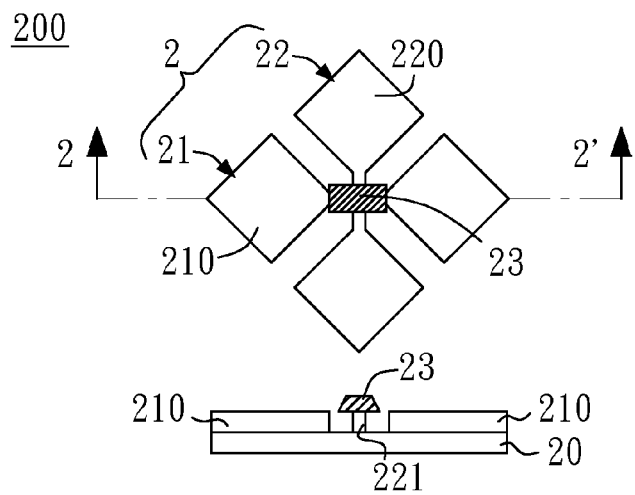
Figure 2C:
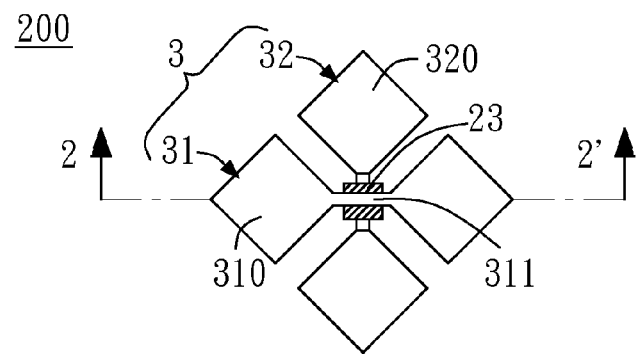

FIG. 2A to FIG. 2C show a process of manufacturing a double-layer electrode device 200 according to one embodiment of the present invention. For better appreciating the invention, only a portion of an electrode pattern is shown. A person skilled in the pertinent art may adapt the shown electrode pattern to entire or partial touch panel.

FIG. 2A shows a top view and a cross-sectional view along a section line 2-2' of the double-layer electrode device 200. An electrode bottom layer 2 is first formed on a surface of a transparent substrate 20. The electrode bottom layer 2 includes plural first electrode lines 21 and plural second electrode lines 22, where the first electrode lines 21 are disposed along a first axis, and the second electrode lines 22 are disposed along a second axis. For better understanding the invention, one of the first electrode lines 21 and one of the second electrode lines 22 are solely illustrated. The first electrode lines 21 are substantially parallel to each other, and the second electrode lines 22 are substantially parallel to each other. The first electrode lines 21 may, but not necessarily, be substantially perpendicular to the second electrode lines 22. The first electrode line 21 includes plural first electrodes 210, and the second electrode line 22 includes plural second electrodes 220. As shown in FIG. 2A, the first electrodes 210 are separated from each other, and adjacent second electrodes 220 along the second axis are connected via second conductive connecting portions 221. The first electrodes 210 and the second electrodes 220 may be designed to a shape other than the rhombus shape as exemplified in FIG. 2A.

The transparent substrate 20 may include insulating material such as glass, Polycarbonate (PC), Polyethylene terephthalate (PET), Polyethylen (PE), Poly vinyl chloride (PVC), Poly propylene (PP), Poly styrene (PS), Polymethyl methacrylate (PMMA) or Cyclic olefin copolymer (COC).

The first electrode line 21 and the second electrode line 22 may include a light-transmissive structure made of a non-transparent material. The non-transparent material may include metal nanowires (e.g., silver nanowires or copper nanowires) or metal nanonets (e.g., silver nanonets or copper nanonets). The metal nanowires or nanonets have a diameter in a nanometer order (i.e., a few nanometers to hundreds nanometers), and may be fixed in the first electrode line 21 and the second electrode line 22 via a plastic material (e.g., resin). Due to fineness of the metal nanowires/nanonets unobservable to human eyes, the first electrode line 21 and the second electrode line 22 made of the metal nanowires/nanonets thus have high light-transmittance. The first electrode line 21 and the second electrode line 22 may further include a photosensitive material (e.g., acrylic), through which electrodes with a required pattern may be formed via an exposure development process.

In another embodiment, the first electrode line 21 and the second electrode line 22 may include a light-transmissive structure made of a transparent material. The transparent material may include indium tin oxide (ITO), indium zinc oxide (IZO), Al-doped ZnO (AZO) or antimony tin oxide (ATO).

FIG. 2B shows a top view and a cross-sectional view along a section line 2-2' of the double-layer electrode device 200. An insulating block 23 is subsequently formed on the second conductive connecting portion 221. The insulating block 23 may have a quadrilateral shape. The insulating blocks 23 may include optically clear adhesive (OCA) or silicon dioxide. The insulating blocks 23 may further include a photosensitive material, through which a required pattern may be formed via an exposure development process.

FIG. 2C shows a top view and a cross-sectional view along a section line 2-2' of the double-layer electrode device 200. Afterward, an electrode top layer 3 is formed on the electrode bottom layer 2. The electrode top layer 3 includes plural first electrode lines 31 and plural second electrode lines 32. For better understanding the invention, one of the first electrode lines 31 and one of the second electrode lines 32 are solely illustrated. The first electrode line 31 includes plural first electrodes 310, and the second electrode line 32 includes plural second electrodes 320. As shown in FIG. 2C, adjacent first electrodes 310 along the first axis are connected via first conductive connecting portions 311, and the second electrodes 220 are separated from each other. The first conductive connecting portion 311 may include metal conductor. The first electrodes 310 and the second electrodes 320 of the electrode top layer 3 have patterns being comparable to, and aligned with, the first electrodes 210 and the second electrodes 220 of the electrode bottom layer 2.

According to the embodiments discussed above, as the double-layer electrode composed of the electrode bottom layer 2 and the electrode to layer 3 has a thickness being substantially larger than the thickness of a conventional touch electrode device (e.g., FIG. 1A to FIG. 1C), the first conductive connecting portion 311 crossing the insulating block 23 can thus be prevented from breakage, thereby increasing yield. On the other hand, the embodiment facilitates the process of forming a thicker electrode layer by forming the electrode bottom layer 2 and the electrode to layer 3 in sequence, compared with the conventional touch electrode device (e.g., FIG. 1C) in which it is more difficult to obtain a thick electrode layer.

Figure 1A:
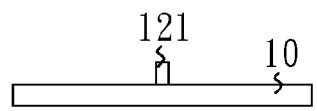
FIG. 1A to FIG. 1C show a process of manufacturing a conventional electrode device.
Figure 1B:
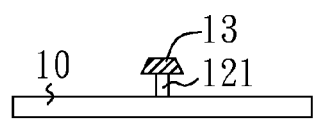
Figure 1C:
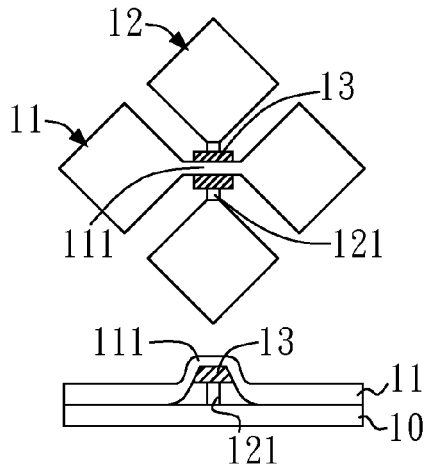

Moreover, the double-layer electrode composed of the electrode bottom layer 2 and the electrode to layer 3, according to the embodiment, has a lower resistance than the conventional touch electrode device. Further, as shown in FIG. 2A, the electrode bottom layer 2 of the embodiment conserves most of the electrode material (with only a minor portion being etched). On the contrary, most of the electrode material has been wasted as illustrated in FIG. 1A.

Although specific embodiments have been illustrated and described, it will be appreciated by those skilled in the art that various modifications may be made without departing from the scope of the present invention, which is intended to be limited solely by the appended claims.

What is claimed is:

1. A double-layer electrode device, comprising:
   a transparent substrate;
   an electrode bottom layer formed on the transparent substrate, the electrode bottom layer including a plurality of first electrode lines and a plurality of second electrode lines, each said first electrode line including a plurality of first electrodes that are separated from each other, and each said second electrode line including a plurality of second electrodes that are connected via second conductive connecting portions;
   a plurality of insulating blocks formed on the second conductive connecting portions respectively; and
   an electrode top layer formed on the electrode bottom layer, the electrode top layer including a plurality of first electrode lines and a plurality of second electrode lines, each said first electrode line including a plurality of first electrodes that are connected via first conductive connecting portions disposed cross the insulating blocks, and each said second electrode line including a plurality of second electrodes that are separated from each other.

2. The device of claim 1, wherein the first electrode lines and the second electrode lines of the electrode bottom layer are perpendicular to each other, or the first electrode lines and the second electrode lines of the electrode top layer are perpendicular to each other.

3. The device of claim 1, wherein the transparent substrate comprises insulating material.

4. The device of claim 3, wherein the insulating material comprises glass, Polycarbonate (PC), Polyethylene terephthalate (PET), Polyethylen (PE), Poly vinyl chloride (PVC), Poly propylene (PP), Poly styrene (PS), Polymethyl methacrylate (PMMA) or Cyclic olefin copolymer (COC).

5. The device of claim 1, wherein, the first electrode line and the second electrode line of the electrode bottom layer comprise a light-transmissive structure made of a non-transparent material, or the first electrode line and the second electrode line of the electrode top layer comprise the light-transmissive structure made of the non-transparent material.

6. The device of claim 5, wherein the non-transparent material comprises a plurality of metal nanowires or metal nanonets.

7. The device of claim 5, wherein the first electrode line and the second electrode line of the electrode bottom layer comprise a photosensitive material, or the first electrode line and the second electrode line of the electrode top layer comprise the photosensitive material.

8. The device of claim 1, wherein the first electrode line and the second electrode line of the electrode bottom layer comprise a light-transmissive structure made of a transparent material, or the first electrode line and the second electrode line of the electrode top layer comprise the light-transmissive structure made of the transparent material.

9. The device of claim 8, wherein the transparent material comprises indium tin oxide (ITO), indium zinc oxide (IZO), Al-doped ZnO (AZO) or antimony tin oxide (ATO).

10. The device of claim 1, wherein the insulating blocks comprise optically clear adhesive (OCA) or silicon dioxide.

11. The device of claim 1, wherein the insulating blocks comprise a photosensitive material.

* * * * *